(12) United States Patent
Bittner et al.

(10) Patent No.: US 7,657,528 B2
(45) Date of Patent: Feb. 2, 2010

(54) METHOD, COMPUTER PROGRAM PRODUCT AND ARTICLE OF MANUFACTURE FOR PROVIDING SERVICE-TO-ROLE ASSIGNMENT TO LAUNCH APPLICATION SERVICES IN ROLE-BASED COMPUTER SYSTEM

(75) Inventors: Peter Bittner, Hockenheim (DE);
Bernhard Drittler, Walldorf (DE);
Jürgen Heymann, Leimen (DE);
Sterfan Kusterer, Nussloch (DE); Sven Schwerin-Wenzel, Dielheim (DE);
Thorsten Vieth, Wiesloch (DE)

(73) Assignee: SAP AG, Walldorf (DE)

( * ) Notice: Subject to any disclaimer, the term of this patent is extended or adjusted under 35 U.S.C. 154(b) by 50 days.

(21) Appl. No.: 10/472,272

(22) PCT Filed: Mar. 11, 2002

(86) PCT No.: PCT/EP02/02639

§ 371 (c)(1),
(2), (4) Date: Feb. 25, 2004

(87) PCT Pub. No.: WO02/075532

PCT Pub. Date: Sep. 26, 2002

(65) Prior Publication Data

US 2004/0139087 A1    Jul. 15, 2004

(30) Foreign Application Priority Data

Mar. 20, 2001    (EP) .................................. 01106904

(51) Int. Cl.
*G06F 17/30* (2006.01)

(52) U.S. Cl. ........................ 707/9; 707/2; 707/7; 726/1

(58) Field of Classification Search ...................... 707/9, 707/2, 7; 726/1
See application file for complete search history.

(56) References Cited

U.S. PATENT DOCUMENTS 5,602,993 A    2/1997    Strömberg (Continued)

FOREIGN PATENT DOCUMENTS

JP    05346902 A    12/1993

(Continued)

OTHER PUBLICATIONS

Moffett, J.D. et al, "The Use of Role Hierarchies in Access Control," Proceedings of the RBAC'99: Fourth ACM Workshop on Role Based Access Control, Fairfax, VA, USA, Oct. 28-29, 1999, pp. 153-160.

*Primary Examiner*—Apu M Mofiz
*Assistant Examiner*—Monica M Pyo
(74) *Attorney, Agent, or Firm*—Mintz Levin Cohn Ferris Glovsky & Popeo, P.C.

(57) ABSTRACT

In a computer system (100) that launches application services for predetermined roles, a service-to-role assignment is customized in a target table. The user inserts a CD-ROM with master and reference tables, and the system automatically provides the target table. The master table (119) stores a first assignment (112) of application services (S, 151-156) to roles (RO), and stores a second assignment (113) of service attributes (SA), such as language or industry branch, of the application services (S). The reference table (129) stores reference attributes (REA) for each application service (S) in the master table. The service representations for each role (RO) are forwarded from the master table (119) into the target table (149) if service and reference attributes match.

7 Claims, 7 Drawing Sheets

119 MASTER TABLE

112 TABLE WITH SERVICE - TO - ROLE ASSIGNMENT

| ROLE RO | SERVICE S |
|---|---|
| RO1 " COST ACCOUNTANT " | S1 " PERFORM COST ESTIMATE "<br>S2 " LONG RANGE INCREMENTAL COSTING "<br>S3 " INTERCONNECTION RATES "<br>S4 " COST OF LOAN "<br>S5 " COST CENTER PLANNING "<br>S6 " PERIOD END CLOSING " |
| RO2 " COST ESTIMATOR " | S1 " PERFORM COST ESTIMATE "<br>S2 " LONG RANGE INCREMENTAL COSTING "<br>S3 " INTERCONNECTION RATES "<br>S4 " COST OF LOAN " |
| RO3 " PERFORM COST ESTIMATE " | S1 " PERFORM COST ESTIMATE "<br>S4 " COST OF LOAN " |

113 TABLE WITH SERVICE - ATTRIBUTE - TO - SERVICE ASSIGNMENT

| SERVICE S | SERVICE ATTRIBUTE SA |
|---|---|
| S1 | SA0 " CROSS - INDUSTRY " |
| S2 | SA1 " TELECOMMUNICATION " |
| S3 | SA1 " TELECOMMUNICATION "<br>SA3 " UTILITY " |
| S4 | SA2 " BANKING " |
| S5 | SA0 " CROSS INDUSTRY " |
| S6 | SA0 " CROSS INDUSTRY " |

U.S. PATENT DOCUMENTS

| | | | |
|---|---|---|---|
| 5,659,746 A * | 8/1997 | Bankert et al. | 707/205 |
| 5,742,829 A | 4/1998 | Davis et al. | |
| 5,778,356 A * | 7/1998 | Heiny | 707/2 |
| 5,933,647 A | 8/1999 | Aronberg et al. | |
| 6,202,066 B1 * | 3/2001 | Barkley et al. | 707/9 |
| 6,385,724 B1 * | 5/2002 | Beckman et al. | 713/167 |
| 2002/0049622 A1 * | 4/2002 | Lettich et al. | 705/7 |

FOREIGN PATENT DOCUMENTS

| | | |
|---|---|---|
| JP | 07239767 A | 9/1995 |
| JP | 09114650 A | 5/1997 |
| JP | 10254979 A | 9/1998 |
| JP | 10254980 A | 9/1998 |
| JP | 2000-172499 A * | 6/2000 |
| JP | 2000172499 A | 6/2000 |
| WO | WO 01/16701 | 3/2001 |

\* cited by examiner

119 MASTER TABLE

112 TABLE WITH SERVICE - TO - ROLE ASSIGNMENT

| ROLE RO | SERVICE S |
|---|---|
| RO1  " COST ACCOUNTANT " | S1  " PERFORM COST ESTIMATE "<br>S2  " LONG RANGE INCREMENTAL COSTING "<br>S3  " INTERCONNECTION RATES "<br>S4  " COST OF LOAN "<br>S5  " COST CENTER PLANNING "<br>S6  " PERIOD END CLOSING " |
| RO2  " COST ESTIMATOR " | S1  " PERFORM COST ESTIMATE "<br>S2  " LONG RANGE INCREMENTAL COSTING "<br>S3  " INTERCONNECTION RATES "<br>S4  " COST OF LOAN " |
| RO3  " PERFORM COST ESTIMATE " | S1  " PERFORM COST ESTIMATE "<br>S4  " COST OF LOAN " |

113 TABLE WITH SERVICE - ATTRIBUTE - TO - SERVICE ASSIGNMENT

| SERVICE S | SERVICE ATTRIBUTE SA |
|---|---|
| S1 | SA0  " CROSS - INDUSTRY " |
| S2 | SA1  " TELECOMMUNICATION " |
| S3 | SA1  " TELECOMMUNICATION "<br>SA3  " UTILITY " |
| S4 | SA2  " BANKING " |
| S5 | SA0  " CROSS INDUSTRY " |
| S6 | SA0  " CROSS INDUSTRY " |

FIG. 2

129 TABLE WITH REFERENCE ATTRIBUTES

| REFERENCE ATTRIBUTES REA |
|---|
| REA0 " CROSS - INDUSTRY " |
| REA1 " TELECOMMUNICATION " |

FIG. 3

149 TARGET TABLE WITH SERVICE - TO - ROLE ASSIGNMENT

| ROLE | SERVICE |
|---|---|
| RO1 " COST ACCOUNTANT " | S1 " PERFORM COST ESTIMATE "<br>S2 " LONG RANGE INCREMENTAL COSTING "<br>S3 " INTERCONNECTION RATES "<br>S5 " COST CENTER PLANNING "<br>S6 " PERIOD END CLOSING " |
| RO2 " COST ESTIMATOR " | S1 " PERFORM COST ESTIMATE "<br>S2 " LONG RANGE INCREMENTAL COSTING "<br>S3 " INTERCONNECTION RATES " |
| RO3 " PERFORM COST ESTIMATE " | S1 " PERFORM COST ESTIMATE " |

FIG. 4

METHOD, COMPUTER PROGRAM PRODUCT AND ARTICLE OF MANUFACTURE FOR PROVIDING SERVICE-TO-ROLE ASSIGNMENT TO LAUNCH APPLICATION SERVICES IN ROLE-BASED COMPUTER SYSTEM

FIELD OF THE INVENTION

The present invention generally relates to role-based computer systems that launch computer application services, and more particularly, relates to a method for providing the service-to-role assignment in a continuously changing business environment.

BACKGROUND OF THE INVENTION

Computer systems are of vital importance in almost all organizations such as, for example, manufacturing facilities, travel agencies, call centers, financial institutions, business organization, etc.

In each organization, groups of users with similar responsibilities share application services, whereas other groups of users with other predefined responsibilities require other application services. To comply with these requirements, the system offers application services like service 1 "perform cost estimate", service 2 "long range incremental costing", services "interconnection rates" and so on. Multiple users access the system in different roles. For example, in the finance department, a first person that is "cost accountant" uses services 1-6 but a second person that is "cost estimator" uses services 3-6 only.

The applications services belonging to a role appear to the user in the human interface, for example, by graphical symbols like icons. In other words, roles link people and processes in a predefined relationship. It is an advantage that roles limit the number of displayed services from all available services. Thereby, roles hide the complexity of the overall system landscape from the user.

In reality, a single role uses 10, 100 or even more services. The role definitions are stored in assignment tables with predefined representations of application services. The service-to-role assignments are provided by role-designers.

Each installation of a role-based system requires role customizing. For example, for the finance system, the roles are basically the same for all industry branches, but some branches require additional specific services.

It is a serious technical problem that assignment tables get very large, and that different assignment tables have to be stored for different installations. The amount of data to be maintained becomes huge.

Hence, the present invention seeks to provide method, computer program product and apparatus for an improved role management.

SUMMARY OF THE INVENTION

The present invention relates to a method for providing a service-to-role assignment to launch application services through a role-based computer system. The method comprises the following steps:

providing a master table with a first assignment of application services to roles, and with a second assignment of first service attributes to the application services, wherein the first service attributes belong to a first type;

providing a reference table with first reference attributes that also belong to the first type;

for each application service in the master table, comparing the first service attributes with the first reference attributes of the reference table, and in case of matching, forwarding for each role service representations from the master table into a target table, the content of the target table representing the service-to-role assignment to launch the application services.

The technical problem of large assignment tables is solved. It is sufficient to provide the master table and the reference table. According to the present invention, attribute comparing and conditionally forwarding representations if attributes match allows to provide the target table at substantially any time. There is no need to maintain a large service-to-assignment table any longer. According to the present invention, separately providing master and reference tables in combination with the automatic generation of the target table leads to enhanced functionality of role-based systems.

The steps providing the master table, a further assignment of second service attributes to the application services is provided, wherein the second service attributes belong to a second type; wherein in the step providing the reference table, second reference attributes are provided that belong to the second type; wherein in the comparing step, the second service attributes are compared with the second reference attributes of the reference table; wherein in the forwarding step, for each role service, representations from the master table are copied into the target table.

The forwarding step is performed only when in the comparing step the service attributes match the reference attributes for both types.

The step providing a reference table, the first reference attribute is derived from user log on information.

The first reference attribute is a language of the user.

The first reference attribute is determined by the type of the application system that is coupled to the role-based computer system.

The present invention also relates to a computer-readable medium having a plurality of sequences of instructions stored thereon which, when executed by at least one processors, cause the at least one processor to perform the steps mentioned above in connection with claim 1.

The present invention also relates to an article of manufacture including one or more computer-readable media having a plurality of sequences of instructions stored thereon which, when executed by at least one processors, cause the at least one processor to perform the steps of mentioned above in connection with claim 1.

BRIEF DESCRIPTION OF THE DRAWINGS

FIGS. 2-4 illustrate tables that store data according to the present invention, wherein FIG. 2 illustrates a master table with input data; FIG. 3 illustrates a reference table with further input data; FIG. 4 illustrates a target table with output data;

DETAILED DESCRIPTION OF THE INVENTION

For ease of understanding, the following description uses acronyms such as "RO" for "role", "RE" for "reference", "S" for "service", "T" for "type", and "A" for "attribute". Unless specified otherwise, the explanation refers to a first type (T) of attributes. Prime markers indicate an optional second type (T'). Numerals are optionally added for distinction. Language in quotation marks indicates examples for convenience of explanation.

Figure 1:
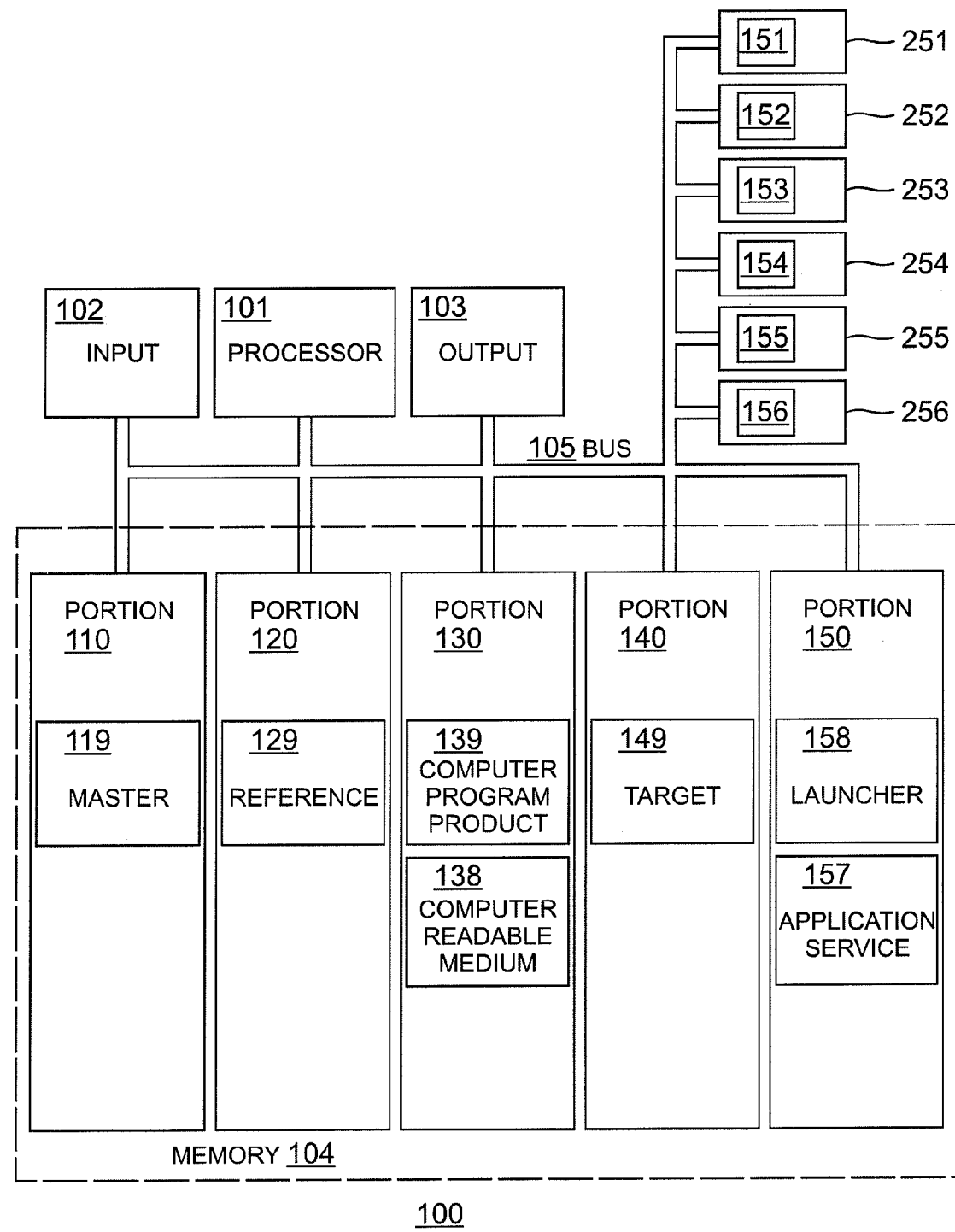
FIG. 1 illustrates a simplified block diagram of a role-based computer system of the present invention that uses a computer program product of the present invention.

FIG. 1 illustrates a simplified block diagram of role-based computer system 100 of the present invention that uses computer program product 139 of the present invention.

Computer system 100 comprises processor 101, input device 102, output device 103, memory 104 (dashed frame) with portions 110, 120, 130, 140 and 150, as well as bus 105. Computer system 100 can be implemented, for example, by a conventional personal computer.

FIG. 1 also illustrates a plurality of application systems 251-256 for executing application services 151-156, respectively. Systems 251-256 are conveniently coupled to system 100 by bus 105.

Preferably, systems 251-256 are computers with processor and memory, such as portable or stationary personal computers (PC). The separation of hardware into system 100 and system 251-256 is convenient for explanation, but not necessary for the present invention.

Input device 102 receives memory content, and can be implemented, for example, by a keyboard, a data reader, a network connection, a modem, or the like.

Optional output device 103 outputs memory content, preferably, such as target table 149 (details below) provided by product 139. Device 103 can be implemented, for example, by a display screen, a printer, a network connection, a modem, or the like.

Although symbolized by separate units, persons of skill in the art can combine input device 102 with output device 103 to a single input-output device, for example, by a CD-ROM read und write unit.

Memory 104 is implemented such that some or all of portions 110, 120, 130, 140 and 150 are located in different memory arrangements, like hard-disk drives, volatile memory (e.g., RAM) or non-volatile memory (e.g., ROM, CR-ROM) and the like. However, memory 104 can also be a single memory that implements all portions, for example, in a single memory chip arrangement.

Processor 101 executes instructions of computer program product 139 of the present invention. Although illustrated by a single unit, processor 101 can be implemented by multiple processors. As input, processor 101 reads master table 119 (with tables 112, 113) and reads reference table 129. As a result, processor 101 provides target table 149 with the service-to-role assignment. Computer program product 139 has a plurality of sequences of instructions, that—when executed by processor 101—cause it to perform method steps explained below (cf. FIG. 5, method 400). The present invention can also be defined as computer-readable medium 138 ("article of manufacture") having a plurality of sequences of instructions stored thereon which, when executed by a processor. (e.g. processor 101, or more processors), cause it to perform the steps of method 400. In the example of FIG. 1, medium 138 is illustrated as a CD-ROM that is inserted into device 101 for reading product 139 into memory portion 130. Optionally, tables 119 and 129 can be provided by CD-ROM as well.

Application service 157 that resides in portion 150 is optionally executed by processor 100. Launcher 158 that also resides in portion 150 accesses table 149 and triggers the executing of application services 151-156 and 157, for example, by sending a start signal to systems 251-256 or by starting service 157 directly. Persons of skill in the art can provide launcher 158 without the need of further explanation herein. The start signal can be, for example, a unique resource locator (URL) or a unique resource identifier (URI).

Bus 105 symbolizes the physical connection between processor 101, devices 102/103, and memory portions 110-150; the connection can extend across elements that are physically separated. Bus 105 can be implemented conventionally by means well known in the art, for example, inside system 100 by a system bus and outside by a local area network (LAN) or by a wide area network (WAN). Protocols that govern the operation of bus 105 are also well known, such as, for example, transmission control protocol/internet protocol (TCP/IP).

FIG. 1 also symbolizes the content of the memory portions: Memory portion 110 stores master table 119, portion 120 stores reference table 129, portion 130 stores computer program product 149, and portion 150 stores launcher 158. Tables 119, 129 and 149 store data according to the present invention, details are explained in connection with FIGS. 2-4.

For convenience of understanding, connections within the memory portions are left out. Persons of skill in the art can provide signals that transport information between and inside portions 110-150, devices 102/103, and processor 101, without the need of further explanation herein.

FIGS. 2-4 illustrate the tables that store data according to the present invention, wherein FIG. 2 illustrates master table 119 with input data (RO, S, SA); FIG. 3 illustrates reference table 129 with further input data (RE); and FIG. 4 illustrates target table 149 with output data (RO, S). For convenience of explanation, the tables are illustrated with rows and columns; assignments are performed within rows; elements in the right column are assigned to elements in the left column.

FIG. 2 illustrates master table 119 ("MASTER") being conveniently divided into two parts: table 112 stores the assignment of services (S) to roles (RO), and table 113 stores the assignment of service attributes (SA) to services (S). Table 113 is also referred to as "service repository".

As stored in table 112, in the example, the "cost accountant" can use services 151-156 (cf. FIG. 1) represented by S1 to S6, respectively; the "cost estimator" can use services 151-154 represented by S1-S4, respectively; and the "cost estimate performer" can use services 151 and 154 by S1, S4, respectively. The assignment in table 112 still neglects customization; it rather offers a wide range of service that could be used in these roles disregarding their future use, for example, in various industries and countries. The redundancy in table 112 for some services can be interpreted as a role hierarchy; but this is not required by the present invention.

According to the present invention, customization data is stored in table 113: service attributes (SA) are assigned to services. For example, services S1, S5 and S6 are used in all industry branches, so that attribute "SA0" ("cross-industry") is assigned to these services as all-matching element; services S2 and S3 are used in the "telecommunication" branch ("SA1"); service S3 is also used in the "utility" branch; and S4 is used in "banking" branch only ("SA2"). The service attributes SA in table 113 belong to the first type (T, e.g., "branches"). A single service can have more than one service attribute SA; this is illustrated here, for example, for service S3.

FIG. 3 illustrates reference table 129 with reference attributes REA that are of the same type as the service attributes (SA) in table 113. In the example, table 129 indicates the branch for which system 100 is customized (REA0 "cross-industry" and REA2 "telecommunication").

FIG. 4 illustrates target table 149 provided by computer program product 139. Table 149 indicates the properly customized role assignment. In the example, roles use services S1, S2, S3, S5 and S6 only. The system is configured for "cross-industry" and "telecommunication" use, but the "banking" service ("SA2" in FIG. 2) is excluded, because table 129 does not refer to this attribute. Service S3 that carries the "utility" attribute (cf. "SA3" in FIG. 2) is included because it also carries the "telecommunication" attribute.

Figure 5:
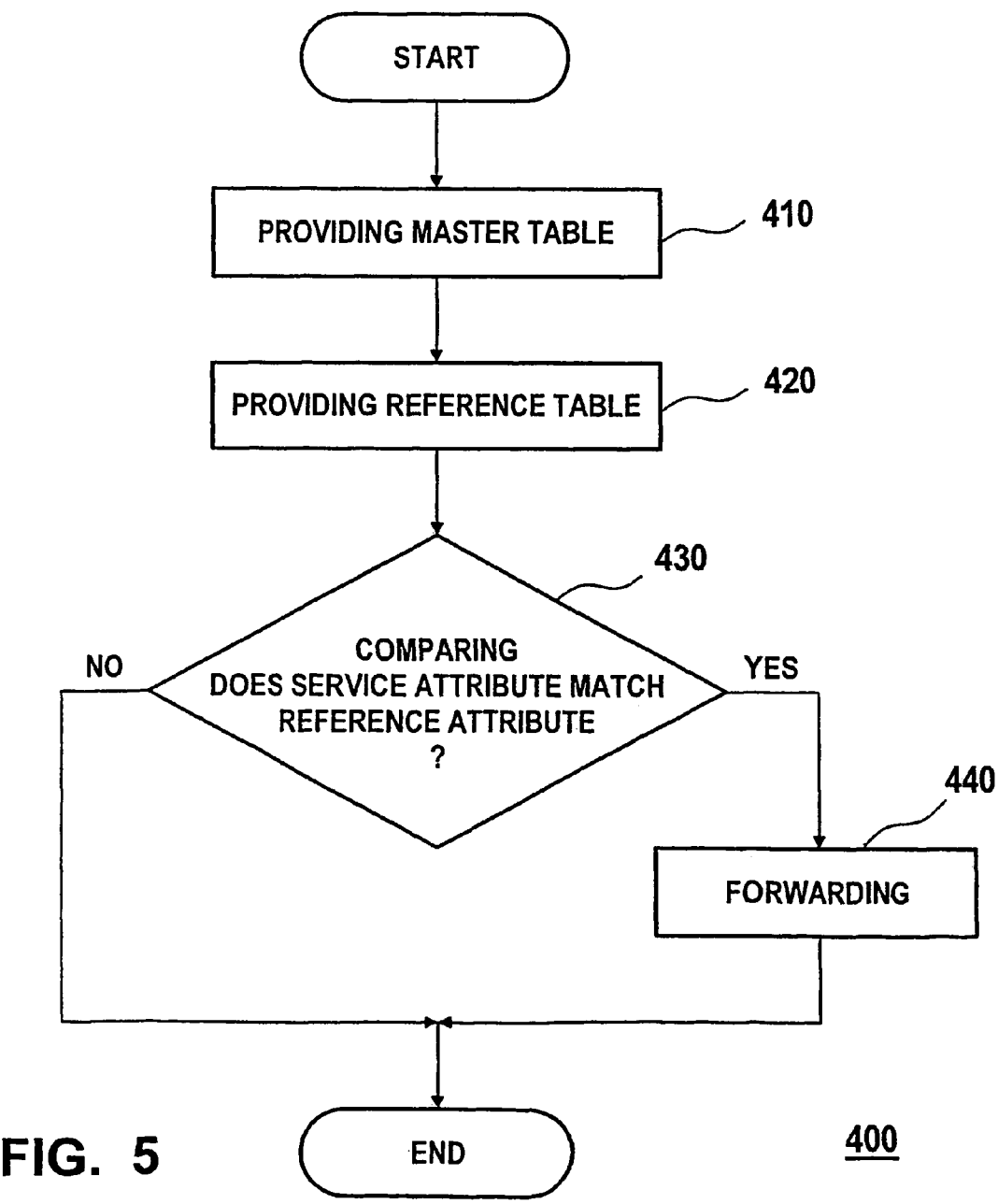
FIG. 5 illustrates a simplified flow chart diagram of a method according to the present invention in a first embodiment.

FIG. 5 illustrates a simplified flow chart diagram of method 400 according to the present invention in a first embodiment. Method 400 for providing a service-to-role assignment to launch application services (e.g., 151-156 in FIG. 1) in role-based computer system 100 comprises the following steps: providing 410 master table, providing 420 reference table, comparing 430, and conditionally forwarding 440.

In step 410, system 100 provides master table 119 (cf. FIG. 2) with a first assignment of application services to roles in table 112 and with a second assignment of first service attributes (SA) to the application services in table 113. As mentioned above, the service attributes (SA) belong to a first type (T, e.g., "branches").

In step 420, system 100 provides reference table 129 with first reference attributes (REA) that also belong to the first type (T).

In step 430, system 100 compares the first service attributes (SA) in table 113 with the first reference attributes (REA) in reference table 129 (cf. FIG. 3). System 100 performs step 430 for each application service in table 112. In other words, system 100 queries: "Does service attribute match reference attribute?"

In case of matching (YES), system 100 in step 440 copies for each role the service representations (i.e., S1, S2 . . . ) from master table 119 into target table 149 (cf. FIG. 4), the content of target table 149 represents the service-to-role assignment that is required to launch the customized application services. In case of mismatching attributes (NO), system 100 ignores the services for the mismatching attributes.

Having a single attribute assigned to the services is convenient for explanation. Optionally, the services have attributes of second or further types (T'). For example, further attributes can be "countries". For services that are applicable in all countries, the service attribute SA' would be an all-matching attribute ("all-countries"); for services that are applicable in the European currency zone, the service attribute SA would be "EURO zone".

Preferably, in providing 410 the master table, a further assignment of second service attributes (SA') to services (S) is provided; wherein in providing 420 the reference table, second reference attributes (REA') are provided that belong to the second type T'; wherein in the comparing 430, the second service attributes (SA') are compared with the second reference attributes (REA') of the reference table; wherein forwarding 440 (if matching), for each role (RO) service, representations from master table 119 are copied into the target table 149. Preferably, forwarding 440 to target table 149 is performed only when the service attributes match the reference attributes for both types (SA=REA, SA'=REA').

Preferably, in providing 420 the reference table, product 139 causes system 100 to download the reference attribute from system definitions in system 100, such as downloading the "country" attribute.

The invention allows to ease customizing. When installing the role-based system, the user can simply insert a CR-ROM with master and reference tables, and the system automatically provides adjusted service-to-role assignments. The above-mentioned technical problem of very large assignment tables is alleviated. After completion (i.e. of method 400), the user can delete tables 119 and 129. Also, the efforts to maintain different assignment tables can be reduced. Table 149 can be generated on request when needed by the computer at substantially any time.

In the prior art, the role designer was forced to provided roles within a given attribute structure; the present invention allows an attribute independent design without loosing the advantages of automatic customizing (e.g., method 400). Technically, role design and attributing services (assignments) are independently stored in tables 119, 129. These tables can be provided at different times and can be created by different systems. This separation, in terms of storage location, time, and origin, in combination with the automation of the present invention leads to enhanced functionality of role-based systems.

Figure 6:
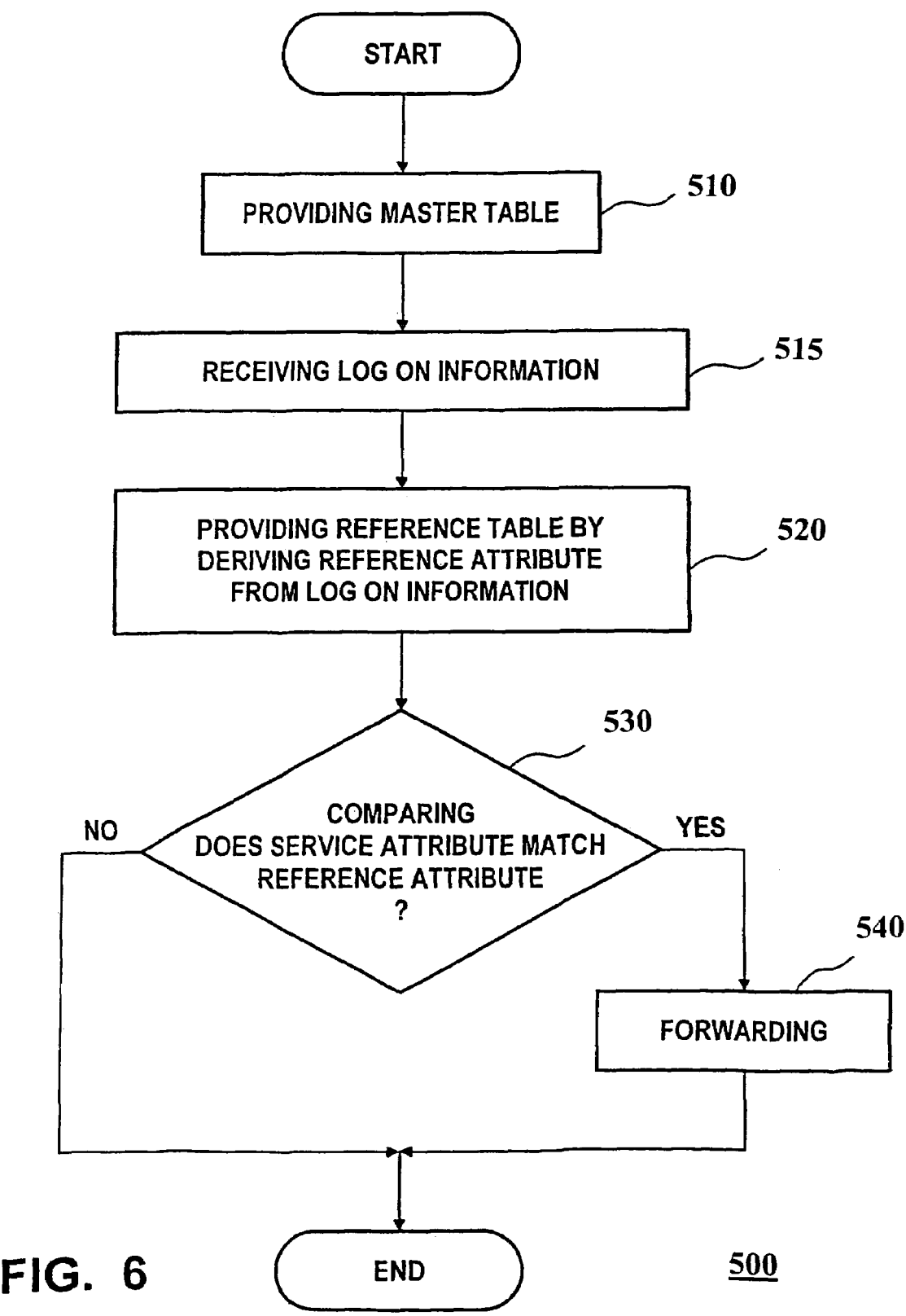
FIG. 6 illustrates a simplified flow chart diagram of the method according to the present invention in a second embodiment.
Figure 7:
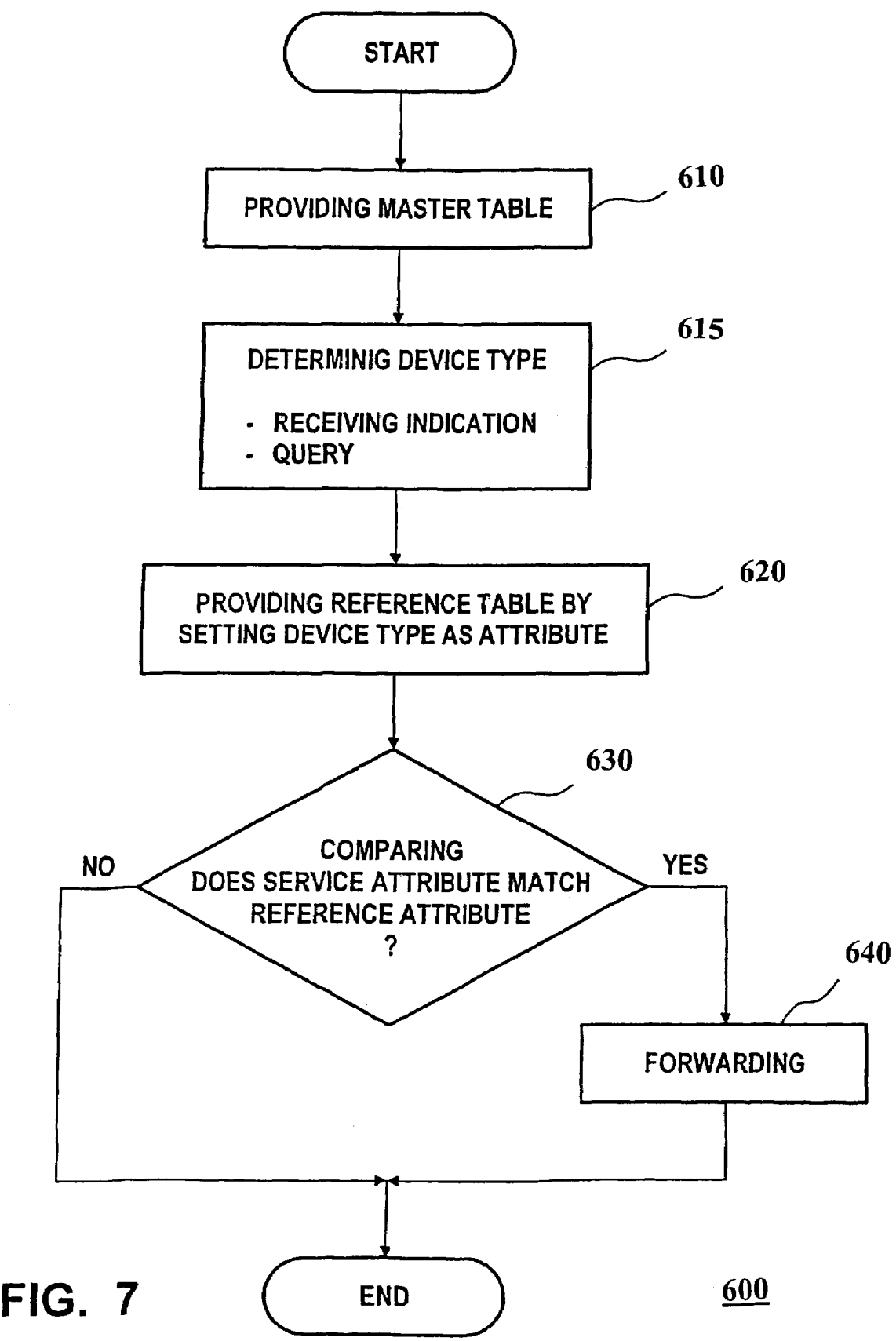
FIG. 7 illustrates a simplified flow chart diagram of the method according to the present invention in a third embodiment.

Customization, that comprises, among other things, the completion of method 400, is followed by the interaction between the users and role-based system 100. First, the users log on into system 100 by providing their identification (optionally with pass word); second, system 100 then determines the roles of the users; third, system 100 reads target table 149; and fourth, system 100 launches the application services that are assigned to the roles. In other words, for static operation, system 100 performs method 400 before the users log on. The present invention is not limited to static operation as the following embodiments will show. In FIGS. 5-7, like reference numerals denote like method steps.

FIG. 6 illustrates a simplified flow chart diagram of method 500 according to the present invention in a second embodiment. In dynamic operation, system 100 performs method 500 substantially in parallel to the log on procedure. In other words, modified method 500 further comprises receiving 515 log on information from the user. During providing 520 the reference table, the reference attribute REA is derived from the user log on information. For example, the log on information indicates the preferred language of the uses (e.g., English or German) and the language is used as reference attribute.

FIG. 7 illustrates a simplified flow chart diagram of method 600 according to the present invention in a third embodiment. In dynamic operation, system 100 performs method 600 substantially in parallel with automatically recognizing the type of the system (e.g., 251-256) that implements the application service (e.g., 251 256). Reference attribute REA is determined by the system type. In case of that a system is not available, the system type is "not available". In other words, modified method 600 comprises determining 616 the system type, for example, (a) by reading an indication issued from systems 251 256 or (b) by processor 101 querying all systems 251 256 coupled to bus 105. During providing 620 the reference table, the reference attribute REA is set according to the system type.

Automatic system recognition frees the user from manually selecting a system. Services that are part of master table 119 but that do not run on the application systems are not presented to the user.

The invention claimed is:

1. A method for providing a service-to-role assignment to launch application services through a role-based computer system, the method comprising the following steps:

providing a master table with a first assignment of application services to roles, and with a second assignment of first service attributes to the application services, wherein the first service attributes belong to a first type, the application services each executable by a processor, the application services each configured based on the master table, a reference table, and a target table;

providing the reference table with first reference attributes associated with the first type, the reference table used to configure, based on the first type, a system comprising the application services;

for each application service in the master table, comparing the first service attributes of the master table with the first reference attributes of the reference table;

when the comparison results in a match, forwarding, for each role, service representations from the master table into the target table, the content of the target table representing the service-to-role assignment to launch the application services;

defining the first type as at least one of an industry branch and a country;

combining a first table comprising the first assignment of application services to roles and a second table comprising the second assignment of first service attributes to the application services, wherein the combined first and second tables form the master table; and wherein in the step providing the reference table, second reference attributes are provided that belong to a second type; wherein in the comparing step, the second service attributes are compared with second reference attributes of the reference table; wherein in the forwarding step, for each role, service representations from the master table are copied into the target table.

2. The method of claim 1, wherein the forwarding step is performed only when in the comparing step the service attributes match the reference attributes for both types.

3. The method of claim 1, wherein in the step of providing a reference table, the first reference attribute is derived from user log on information.

4. The method of claim 3, wherein the first reference attribute is a language of the user.

5. The method of claim 1, wherein the first reference attribute is determined by the type of the application system that is coupled to the role-based computer system.

6. A computer-readable medium having a plurality of sequences of instructions stored thereon which, when executed by at least one processor, cause the processor to perform the steps of:

providing a master table with a first assignment of application services to roles, and with a second assignment of first service attributes to the application services, wherein the first service attributes belong to a first type, the application services each executable by a processor, the application services each configured based on a master table, a reference table, and a target table;

providing the reference table with first reference attributes associated with the first type, the reference table used to configure, based on the first type, a system comprising the application services;

for each application service in the master table, comparing the first service attributes of the master table with the first reference attributes of the reference table;

when the comparison results in a match, forwarding, for each role, service representations from the master table into the target table, the content of the target table representing the service-to-role assignment to launch the application services;

defining the first type as at least one of an industry branch and a country;

combining a first table comprising the first assignment of application services to roles and a second table comprising the second assignment of first service attributes to the application services, wherein the combined first and second tables form the master table; and wherein in the step providing the reference table, second reference attributes are provided that belong to the second type; wherein in the comparing step, the second service attributes are compared with the second reference attributes of the reference table; wherein in the forwarding step, for each role service, representations from the master table are copied into the target table.

7. An article of manufacture including one or more computer-readable media having a plurality of sequences of instructions stored thereon which, when executed by one or more processors, cause said one or more processors to perform the steps of:

providing a master table with a first assignment of application services to roles, and with a second assignment of first service attributes to the application services, wherein the first service attributes belong to a first type, the application services each executable by a processor, the application services each configured based on the master table, a reference table, and a target table;

providing the reference table with first reference attributes associated with the first type, the reference table used to configure, based on the first type, a system comprising the application services;

for each application service in the master table, comparing the first service attributes of the master table with the first reference attributes of the reference table;

when the comparison results in a match, forwarding, for each role, service representations from the master table into the target table, the content of the target table representing the service-to-role assignment to launch the application services;

defining the first type as at least one of an industry branch and a country;

combining a first table comprising the first assignment of application services to roles and a second table comprising the second assignment of first service attributes to the application services, wherein the combined first and second tables form the master table; and wherein in the step providing the reference table, second reference attributes are provided that belong to a second type; wherein in the comparing step, the second service attributes are compared with second reference attributes of the reference table; wherein in the forwarding step, for each role, service representations from the master table are copied into the target table.

* * * * *

UNITED STATES PATENT AND TRADEMARK OFFICE
CERTIFICATE OF CORRECTION

PATENT NO. : 7,657,528 B2  Page 1 of 1
APPLICATION NO. : 10/472272
DATED : February 2, 2010
INVENTOR(S) : Bittner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 129 days.

Signed and Sealed this

Twenty-eighth Day of December, 2010

David J. Kappos
*Director of the United States Patent and Trademark Office*